INVENTOR
Robert I. Van Nice
BY
ATTORNEY

United States Patent Office

3,559,133
Patented Jan. 26, 1971

3,559,133
SHIELDING ARRANGEMENTS FOR ELECTRICAL WINDINGS
Robert I. Van Nice, Sharon, Pa., assignor to Westinghouse Electric Corporation, Pittsburgh, Pa., a corporation of Pennsylvania
Filed June 20, 1969, Ser. No. 835,015
Int. Cl. H01f *15/14*
U.S. Cl. 336—70                    20 Claims

ABSTRACT OF THE DISCLOSURE

Shielding arrangements for increasing the series capacitance of electrical windings of the type having a plurality of continuous pancake type coils arranged in a stack. Each pancake coil has first and second interleaved sections, with the turns of one of the sections being part of the power circuit of the winding, and the turns of the other section being a shielding arrangement. The sections of the pancake coils are interconnected in a predetermined manner to form the power circuit through the winding, depending upon the shielding arrangement used, to reduce the magnitude of voltage oscillations produced when a surge potential is applied to the winding.

BACKGROUND OF THE INVENTION (1) Field of the invention

The invention relates in general to electrical inductive apparatus, such as transformers, and more specifically, to shielded electrical inductive apparatus of the core-form type.

(2) Description of the prior art

Electrical inductive apparatus, such as single and polyphase electrical power transformers of the core-form type commonly utilize a high voltage phase winding which includes a plurality of electrically start-start, finish-finish connected pancake or disc type coils arranged in an axially aligned stack about a winding leg of a magnetic core. A surge potential, such as caused by lightning or switching, applied to the line terminal of a winding of this type, distributes itself across the turns of the pancake coils, across the winding, and from the winding to ground according to the capacitive structure of the winding, with the conductors and ground being "electrodes" of the capacitors, and the winding insulation, and other insulating members, providing the dielectric. It is characteristic of the pancake coil type winding for a surge potential to concentrate at the line end of the winding, and rapidly attenuate as it enters the winding. It is desirable to distribute such surges as uniformly as possible across the turns of the pancake coils, and across the pancake coils of the winding, in order to prevent the stress from building up to undesirably high values, which may cause the stressed insulation to fail. Further, it is desirable to uniformly distribute surge potentials in order to reduce the magnitude of transient voltage oscillations produced when the voltage distribution changes from capacitive to inductive. The more nearly the capacitive voltage distribution conforms to the inductive distribution, the lower the magnitude of transient voltage oscillations produced as the distribution changes from capacitive to inductive.

An indication of how uniformly a surge potential will be distributed across a winding may be obtained from the distribution constant alpha of the winding. The distribution constant alpha is equal to the square root of the ratio of the capacitance $C_g$ of the winding to ground to the through or series capacitance $C_s$ of the winding $$(\alpha c = \sqrt{C_g/C_s})$$

The smaller the distribution constant alpha, the more uniformly a surge voltage will be distributed across the winding. Since the distribution constant alpha may be reduced by increasing the series capacitance of the winding, it is common in the prior art to interleave the turns from different portions of the power circuit, a process called interleaving, which increases the voltage between physically adjacent turns, and adjacent turns are effectively connected in parallel, which increases the through or series capacitance of each pancake coil, and of the electrical winding. Another method used in the prior art for increasing the series capacitance of a winding, called shielding or surge shielding, is to interleave a conductor with the turns of the power circuit, which conductor is connected at only one point thereof to a determined point in the power circuit. This conductor is thus for capacitive purposes only, and need only be large enough to carry charging currents.

Prior art theories concerning voltage oscillations in windings of electrical inductive apparatus have in general been tied to the distribution constant of the winding. It was felt that when the series or through capacitance of a winding is increased, that voltage oscillations would decrease. However, as disclosed in my copending application Ser. No. 686,912, filed Nov. 30, 1967, now Pat. No. 3,477,052, certain types of prior art interleaving arrangements which provide high series capacitance windings, produce voltage oscillations upon steep front surge testing which greatly increase the stress between adjacent pancake coils, which is a maximum near the mid-point of the coil builds. The steep wave front tests cause oscillations which continue after the applied wave is ended, until dissipated in the resistance of the conductors and dielectric losses. These oscillations are not explained by the prior art theories using the distribution constant of the winding, as they may be produced even when the capacitive surge voltage distribution is substantially the same as the inductive or steady state voltage distribution.

Tests have shown that certain prior art shielding arrangements for increasing the series capacitance of electrical windings are objectionably oscillatory when subjected to a surge potential, even though the series capacitance of these windings is very high. Thus, it would be desirable to be able to reduce the magnitude of the voltage oscillations in certain types of shielded windings, if the reduction can be made without offsetting increases in the manufacturing costs of the windings.

SUMMARY OF THE INVENTION

Briefly, the present invention is a new and improved shielded winding arrangement for electrical inductive apparatus which substantially reduces the magnitude of voltage oscillations, and thus the electrical stress between adjacent pancake coils, when the winding is subjected to surge potentials. The invention applies to pancake coils which have a shield conductor wound radially with the power conductor, with the pancake coils being connected in a plurality of basic pairs, and with the basic pairs being interconnected to provide a single series circuit between the ends of the winding. In other words, the pancake coils are connected start-start, finish-finish, or finish-finish, start-start, thus requiring two pancake coils to complete a basic interconnection pattern for the power circuit. As used in this specification, the "start" of a pancake coil is the end of the innermost turn of the power circuit and the "finish" of a pancake coil is the end of the outermost turn of the power circuit.

It has been found that the magnitude of surge voltages may be substantially reduced by interconnecting the power circuits of the pancake coils in a manner which depends upon the connection of the shield conductor.

When adjacent pancake coils of a basic pair of pancake coils have the shield conductors connected together to provide a single discrete continuous shielding circuit through each coil of the pair, with one point of the shielding circuit being connected to a predetermined point of the power circuit, the pancake coils in any basic pair are constructed with the power circuit and shielding circuit in the same relative radial locations in both coils of the pair. Thus, the interconnection between the power circuits of the two coils of the basic pair is made between like radial sections of the pair, and the connection between the two capacitive or shielding conductors of the pair is also made between like radial sections of the basic pair.

When each shielding conductor of each pancake coil of a basic pair has a point electrically connected to the power circuit, and is not directly connected to the capacitive or shielding conductor of the other coil of the pair, the connection of the power circuit between the two coils of a basic pair is made between unlike radial sections of the two pancake coils. In other words, if the innermost turn of one pancake coil is from the power circuit, the other pancake coil of the pair should start with the shielding conductor as the innermost turn, to enable the power circuit to exchange radial positions with the capacitive circuit in the two coils of a basic pair.

BRIEF DESCRIPTION OF THE DRAWINGS

Further advantages and uses of the invention will become more apparent when considered in view of the following detailed description and drawings, in which.

DESCRIPTION OF THE PREFERRED EMBODIMENTS

Figure 1:
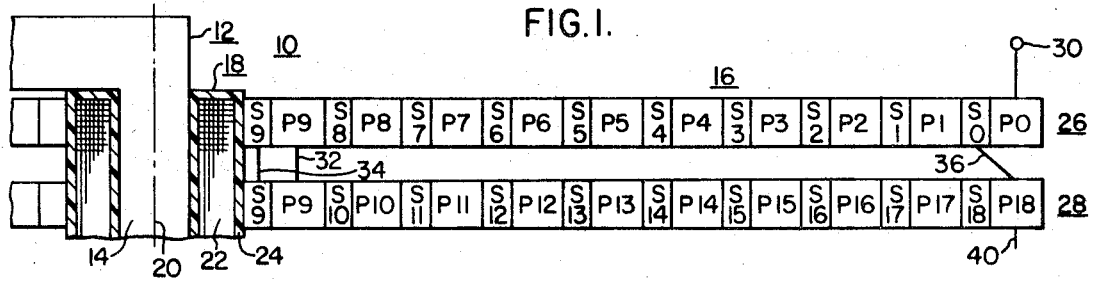
FIG. 1 is a partial sectional elevation of a magnetic core and the high and low voltage windings of a transformer, in which the high voltage winding has shielded pancake coils constructed and connected according to an embodiment of the invention wherein the shielding circuit extends between the two pancake coils of a basic pair with a direct electrical connection.

Referring now to the drawings, and FIG. 1 in particular, there is shown a partial sectional elevation of a transformer 10, which embodies the teachings of the invention. Transformer 10 is a power transformer of the core-form type, and it may be either single or polyphase. Since each phase of the transformer would be similar in the event it is polyphase transformer, only one phase is shown in FIG. 1 in order to simplify the drawing.

Transformer 10 includes a magnetic core 12, which may be conventional construction, including a winding leg 14 having an axis 20 about which high and low voltage windings 16 and 18, respectively, are concentrically disposed. Low voltage winding 18, which may be of conventional construction, has a plurality of conductor turns 22 insulated from the magnetic core 12 and the high voltage winding 16 by electrical insulating means 24.

High voltage winding 16 includes a plurality of pancake or disc type coils 26 and 28 which are spaced axially apart in a stacked arrangement about the axis 20 of the magnetic core leg 14. Only a sufficient number of pancake coils, and turns per pancake coil are shown in FIG. 1, and in the remaining figures, in order to adequately illustrate the invention. It is to be understood that the winding may have any desired number of pairs of pancake coils, and any desired number of turns per pancake coil. Further, while each of the pancake coils in the figures are illustrated as having an odd number of turns per pancake coil, it will be understood that each of the pancake coils of a basic pair may have an even number of turns, or one of the coils of the basic pair may have an odd number of turns, and the other may have an even number of turns.

The plurality of pancake coils of winding 16 are constructed and connected to provide a high series capacitance winding, having a single series circuit between line terminal 30 at the start of winding 16, and a terminal (not shown) at the finish of the winding, which may be a line or a neutral terminal, depending upon the specific construction and application of transformer 10.

Each of the pancake coils 26 and 28 is of the continuous shielded type, each having a plurality of turns of first and second conductors wound together to provide first and second radially interleaved sections, respectively, each having inner and outer ends. As used in this specification, the first section refers to the section having the innermost turn of the pancake coil, and a second section refers to the section which starts with the next to the innermost turn. While all of the pancake coils of winding 16 are serially connected between the two ends of the winding, the interconnection of the coils in a pair of adjacent coils will first be discussed, as it has been found that when the winding is divided into a plurality of basic pairs of coils, and the connection between the coils in each of the basic pairs is made according to the teachings of the invention, that the connection between the basic pairs themselves is not critical from the standpoint of producing and sustaining oscillation upon being subjected to a surge potential.

The first thing to be considered when applying the teachings of the invention, is the specific shielding arrangement to be employed. The first type of shielding arrangement to be examined connects the shield conductor of both pancake coils of a basis pair together, and connects this shielding circuit to the power circuit at some predetermined point. In this shielding ararngement, each pancake coil of the basic pair must have the power and shielding sections of the pancake coils in the same relative radial locations, when observed looking radially outward from the center line 20 of the windings. Thus, if the first pancake coil 26 has the shielding circuit starting at the innermost turn of the pancake coil, as illustrated in FIG. 1, pancake coil 28 must also have the shielding circuit starting at the innermost turn. Specifically, pancake coil 26 has a plurality of conductor turns formed of first and second insulated electrical conductors which are spirally wound together about a common axis to provide first and second coil sections having inner and outer ends, the turns of which are radially interleaved with one another in substantially the same plane. Since the shielding conductor will not carry power current, it is shown with a narrower dimension in the radial direction than the power conductor. The turns of the power conductor are numbered to indicate the number of turns from the start of the basic pair of coils, including a prefix P, and the shielding conductors are given a number, along with the prefix S, which indicates the number of the shielding turns from the start of the basic shielding arrangement. Since in this embodiment the pancake coils are interconnected with start-start, finish-finish connections, the circuit of the first pancake coil 26 spirals inwardly in a first circumferential direction, and the next pancake coil spirals outwardly in the same circumferential direction, in order to produce an additive magnetomotive force in the magnetic core, with the two pancake coils being interconnected with a start-start connection, i.e., a connection between the innermost turns of the power circuits of both pancake coils. Pancake coil 28 is connected to the next pancake coil with a finish-finish connection, i.e., a connection between the outermost turns of the power circuits of the two pancake coils. This completes a basic pair, with the power circuit spiralling inwardly and then outwardly in the remaining basic pairs of the winding. This method of connecting continuous pancake coils is usually preferred because the power conductor may be continuous from pancake coil to pancake coil with a minimum number of brazed connections, and a minimum length of interconnecting conductor.

Pancake coil 28 also has a plurality of conductor turns formed of first and second insulated electrical conductors wound together about a common axis to provide first and second interleaved sections having inner and outer ends. The turns of the power conductor continue the numbering of the power circuit from the first pancake coil, as does the numbering of the turns of the shield conductor.

Thus, as shown in FIG. 1, the first or innermost radial sections in both pancake coils are from the shielding circuit, and the second or outer radial sections of both pancake coils are from the power circuit. The power circuits are interconnected at their innermost turns with start-start connection 32, while the shielding circuits are interconnected at their innermost turns with a start-start connection 34. Since the power and shielding circuits both traverse the two coils of a pair, the prior art exchanges their radial positions in the two coils of a basic pair, apparently in an attempt to obtain a transposition. However, since there is only one power series circuit, and no circuits in parallel with it, a transposition is not possible and indeed the mistaken attempt to secure it has been found to be the cause of the high magnitude voltage oscillations in shielded windings of this type. For example, when surge testing a pair of pancake coils connected similar to pancake coils 26 and 28, except exchanging the radial positions of the power and shielding circuits as taught by the prior art, oscillations are produced which provide a maximum coil to coil stress, which appears at about the midpoint of the coil build, which is 1.9 times the applied voltage. When constructing the pancake coils and connecting them as illustrated in FIG. 1, the maximum coil to coil stress drops to 1.1 times the applied voltage.

Figure 2:
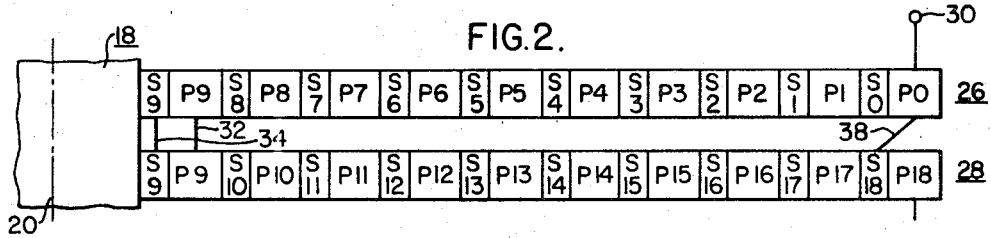
FIG. 2 is a diagrammatic view of the shielded high voltage winding shown in FIG. 1, except with the shielding circuit connected according to another embodiment of the invention.

As shown in FIG. 1, the shielding circuit is continued through each basic pair of pancake coils, but does not continue beyond the basic pair. It is connected to the power circuit at a predetermined point to provide a voltage difference between the turns of the shield conductor and the adjacent power conductor turns. As shown in FIG. 1, the end of the outermost turn S0 of the shield conductor of pancake coil 26 may be connected to the end of conductor turn P18 via conductor 36, which is the outermost turn of pancake coil 28. Or, as shown in FIG. 2, which is a diagrammatic view of pancake coils 26 and 28 shown in FIG. 1, the end of the outermost turn S18 of the shield conductor in pancake coil 28 may be connected to the end of the outermost turn P0 of the power circuit in pancake coil 26, via conductor 38.

Figure 3:
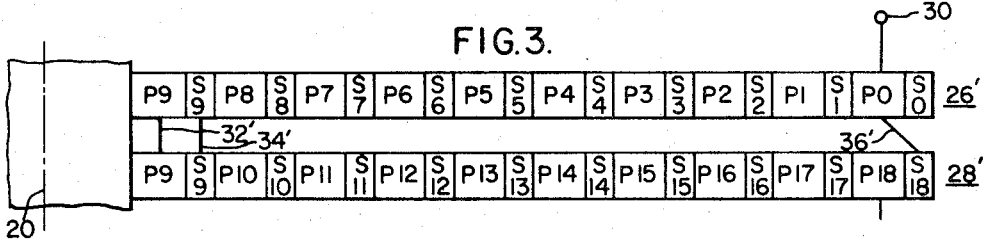
FIG. 3 is a diagrammatic view of a shielded high voltage winding illustrating another embodiment of the invention, for pancake coils where the capacitive circuit extends between the pancake coils of the basic pair.

FIG. 3 is a diagrammatic view of pancake coil 26' and 28', which are similar to the pancake coils 26 and 28 shown in FIG. 1, except the innermost turn of the pancake coils is in the power circuit, instead of the shielding circuit. Components in FIG. 3 similar in function to those of FIG. 1 are given like reference numerals with a prime mark, to indicate they are not identical. FIG. 3 illustrates that in the embodiment of the invention shown in FIGS. 1, 2 and 3, wherein the shield circuit continues between the two pancake coils of the basic pair, that the power and shield circuit must occupy the same radial positions in both pancake coils, but that it is not critical as to which radial positions the power and shield circuits occupy.

Figure 4:
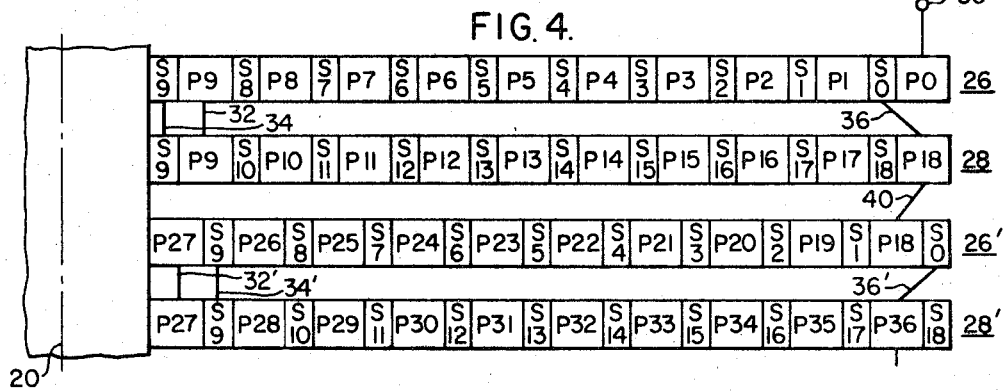
FIGS. 4 and 4A are diagrammatic and schematic views, respectively, of a high voltage winding illustrating how adjacent basic pairs of pancake coils may be interconnected, when the coils of each basic pair are interconnected according to the teachings of the invention.
Figure 4A:
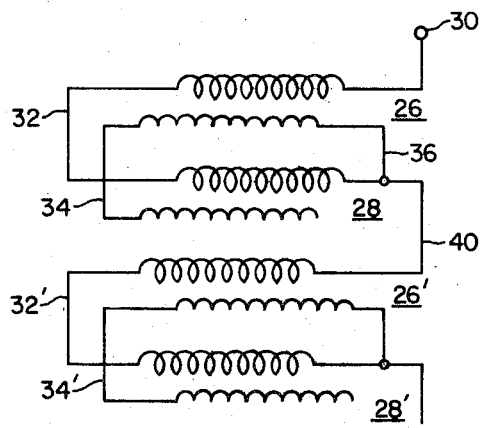

Once the two pancake coils of a basic pair have been properly connected to reduce oscillatory voltage stresses, the basic pairs of pancake coils may be interconnected without regard as to the specific arrangement employed within a basic pair. For example, the next basic pair of pancake coils in FIG. 1 may be constructed similar to pancake coils 26 and 28, in which event conductor 40 from turn P18 would enter a power circuit of the next pancake coil which occupies the same radial position as the power circuit of pancake coils 26 and 28. Or, as shown in FIGS. 4 and 4A, which are diagrammatic and schematic view of pancake coils 26 and 28 of FIG. 1 and pancake coils 26' and 28' of FIG. 3, the finish-finish, connection 40 may interconnect power circuits in differential radial locations. The power conductor turns of pancake coils 26' and 28' have been renumbered in FIG. 4 to indicate the location of the turns from the line terminal 30. The positions of the power and shielding circuits in each pancake coil are shown slightly offset in the schematic dliagram of FIG. 4A, to indicate which is the first or inner section and which is the second or outer section of the pancake coil.

Figure 5:
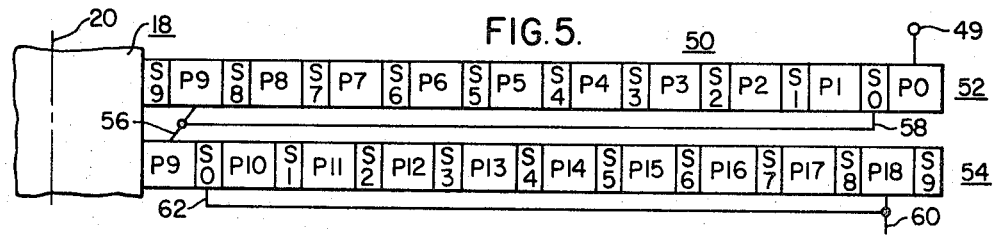
FIG. 5 is a diagrammatic view of a shielded high voltage winding illustrating shielded pancake coils constructed and connected according to an embodiment of the invention where there are two discrete shielding circuits for each basic pair of pancake coils.

The next embodiment of the invention is concerned with the arrangement where the shield conductor in each pancake coil is not directly connected to the sheild conductor of the other pancake coil of the basic pair. In this instance, since the shield conductor does not proceed with the power conductor between the coils, the prior art does not attempt to exchange the relative radial positions of the power and shielding circuits in the two coils of the basic pair. However, it has been found that with this specific shielding arrangement, a substantial reduction in pancake to pancake stress may be realized during a surge potential by exchanging the radial positions of the power and capacitive circuits in a basic pair. An example of this embodiment of the invention is shown in FIG. 5, which is a dagrammatic view of a high voltage winding 50, similar to high voltage winding 16 of FIG. 1, having pancake coils 52 and 54 which form the basic shielding arrangement of a basic pair. One of the pancake coils, such as pancake coil 52, is constructed such that the inner or first interleaved section is from the shielding circuit, while the other of the pancake coils, such as pancake coil 54, is constructed such that the inner or first interleaved section is from the power circuit. Thus, pancake coil 52 of FIG. 5 has two conductors which spiral inwardly together to provide a plurality of power conductors turns and a plurality of shielding turns, with the innermost turn being turn S9 from the shielding circuit. Pancake coil 54 has two conductors which spiral outwardly together, with the innermost turn of pancake coil 54 being turn P9 from the power circuit. Interconnected turns of adjacent pancake coils are given the same turn number to indicate they are at substantially the same potential. The shield circuit restarts the numbering of the shield turns in the second coil of the basic pair, as the shield circuit is complete within each pancake coil, even though the basic shielding arrangement encompasses the two pancake coils of a basic pair. The ends of the innermost turns P9 of the power circuits of pancake coils 52 and 54 are connected via start-start connection 56. One point of each of the shielding circuits is connected to a predetermined point of the power circuit. For example, FIG. 5, illustrates connecting the end of the outermost turn S0 of the shield conductor in pancake coil 52 to the start-start connection 56 via conductor 58, and the end of the innermost turn S0 of the shield conductor in pancake coil 54 to the finish-finish connection 60 via conductor 62. Other suitable arrangements are illustrated in FIGS. 6 and 7, which are diagrammatic views of the pancake coils 52 and 54 shown in FIG. 5.

Figure 6:
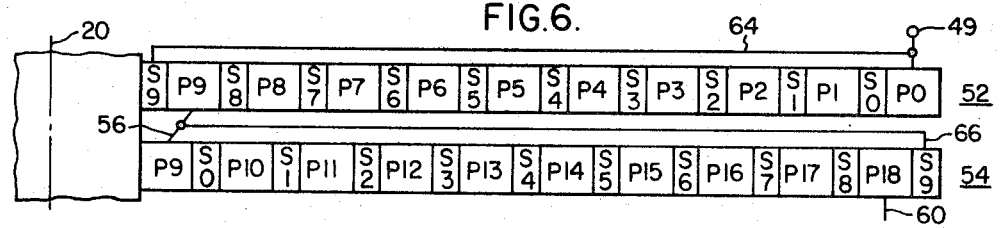
FIG. 6 is a diagrammatic view of the shielded high voltage winding of FIG. 5, except with the shielding circuits connected according to another embodiment of the invention.

FIG. 6 illustrates the end of the innermost turn S9 of the shield conductor of pancake coil 62 connected to the line terminal 49 via conductor 64, and the end of the outermost turn S9 of the shield conductor of pancake coil 54 connected to the start-start connection 56 via conductor 66.

Figure 7:
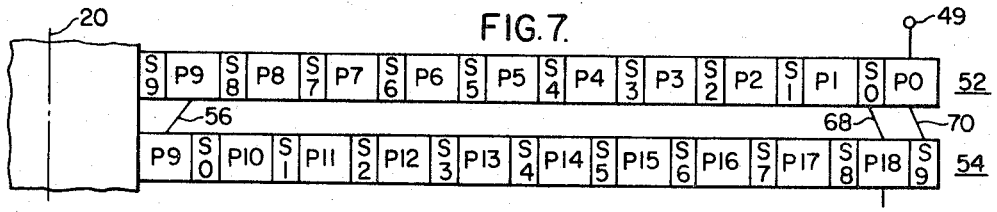
FIG. 7 is a diagrammatic view of the shielded high voltage winding of FIG. 5, except with the shielding circuits connected according to still another embodiment of the invention.

FIG. 7 illustrates the end of the outermost turn S0 of the shield conductor in pancake coil 52 being connected to the end of the outermost turn P18 of the power conductor in pancake coil 54 via connection 68, and the end of the outermost turn S9 of the shield conductor in pancake coil 54 connected to the end of the outermost turn P0 of the power circuit in pancake coil 52, via connection 70.

Figure 8:
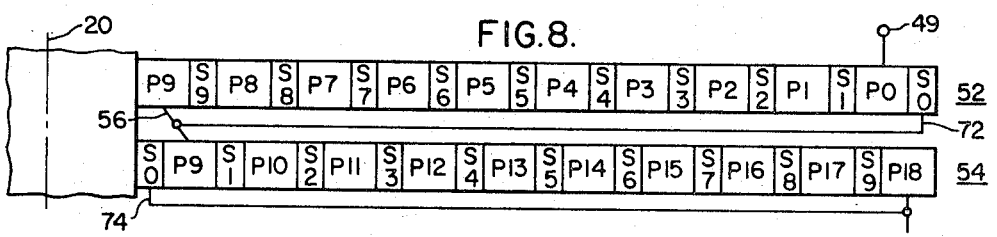
FIG. 8 is a diagrammatic view of a shielded high voltage winding of the type wherein each pancake coil has a discrete shielding circuit, constructed and connected according to another embodiment of the invention.

FIG. 8 is a diagrammatic view which illustrates that the relative axial positions of the pancake coils 52 and 54 may be reversed, with terminal 49 entering pancake coil 54, and with the start-start connection connecting the innermost turn P9 of the power circuit of pancake coil 54 with the next to the innermost turn P9 of the power circuit of pancake coil 52. The end of the outermost turn S0 of the shield conductor in pancake coil 54 is connected to the start-start connection 56 via conductor 72, and the end of the innermost turn S0 of the shield conductor in pancake coil 52 is connected to the end of the outermost turn P18 of pancake coil 52 via conductor 74.

When surge testing a pair of pancake coils with the shield circuits connected similar to the pancake coils shown in FIG. 7, but without interchange of the power circuit between the coils of the basic pair, as taught by the prior art, oscillations were produced which created a maximum coil stress between the midpoints of the coil builds of 1.9 times the applied voltage. Constructing two pancake coils and connecting them as shown in FIG. 7, with an interchange of the power circuits between the two coils of the basic pair, dropped the maximum stress between the two coils to 1.2 times the applied voltage.

Figure 9:
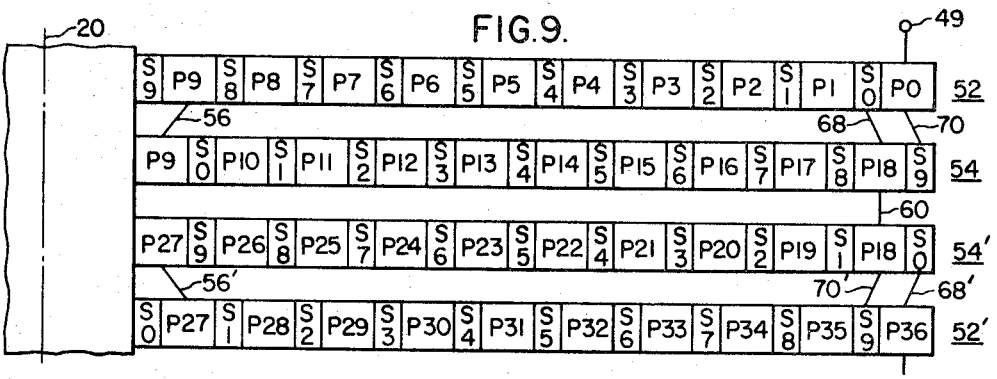
FIGS. 9 and 9A are diagrammatic and schematic views, respectively, of a high voltage winding illustrating how basic pairs of pancake coils may be interconnected, with the coils of the basic pairs being interconnected according to the teachings of the invention.
Figure 9A:
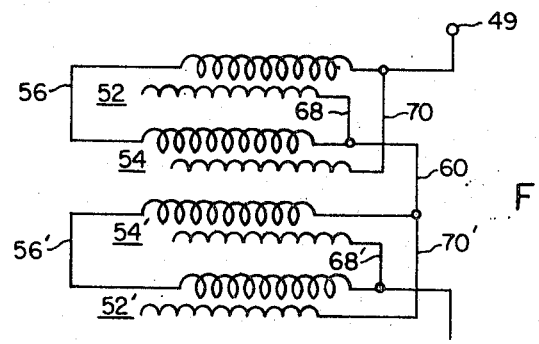

Once the two coils of the basic pair have been properly connected to reduce oscillatory voltage stresses, the basic pairs of coils may be interconnected without regard to the specific arrangement employed within the basic pair. For example, the next pair of coils in FIG. 5 may be constructed and connected similar to the pancake coils 52 and 54, in which event the power circuit would enter a different radial position than it occupied in pancake coil 54 or, the next pair of coils may be constructed as shown in FIGS. 9 and 9A, which are diagrammatic and schematic views of pancake coils 52 and 54 shown in FIG. 5, and pancake coils 54 and 52 shown in FIG. 8, except that the latter two coils have their shielding circuits connected similar to the connections in pancake coils 52 and 54 shown in FIG. 5. When using the arrangement of FIGS. 9 and 9A, the power circuit leaves the last coil of the first basic pair from a predetermined radial position and enters the same radial position in the first pancake coil of the next basic pair.

In summary, when continuous pancake coils of the shielded type have their power circuits connected to provide a single series path through the winding, which traverses each pancake coil once, with the power circuits spiralling inwardly in one pancake and outwardly in the next, i.e., connected start-start, finish-finish, or finish-finish, start-start, the maximum magnitude of voltage oscillations produced between a pair of adjacent coils which make up the basic interconnection pattern may be substantially reduced by an arrangement of the coils and shielding circuits which is contrary to the teachings of the prior art. When the shielding circuit is continuous between the two pancake coils of a basic pair, the two coils of the basic pair should be constructed with the power and shielding circuits in the same radial locations in each coil of the basic pair. The interconnections between the pancakes of a basic pair should not interchange the positions of the power and shielding circuits. When the shielding circuit is complete within each pancake coil, and does not continue between the coils of the basic pair, the two pancake coils of the basic pair must be constructed differently. In one of the coils, the inner radial section should be the power circuit and in the other the inner radial section should be the shielding circuit. Thus, the power interconnection between the pancakes connects power circuits from two different radial positions. The reduction in maximum voltage stress from about 1.9 times the applied voltage to about 1.1 or 1.2 times the applied voltage, enables less electrical insulation to be used between the pancake coils, thus increasing the series capacitance of the winding and further aiding in the uniform distribution of surge voltages across the winding. Further, the reduction in insulating clearances reduces the overall length of the coil stack, which reduces the length of the winding legs of the magnetic core enabling savings to be made in magnetic material, as well as a reduction in the length of the magnetic circuits which increases the efficiency of the magnetic core.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:

1. A winding for electrical inductive apparatus, comprising;
    a plurality of pancake coils arranged in a stack,
    each of said pancake coils having a plurality of turns of first and second conductors wound together to provide first and second radially interleaved sections, respectively, each having inner and outer ends,
    first means interconnecting said pancake coils in basic pairs of first and second adjacent pancake coils to provide a single series power circuit in each basic pair which includes a single pass through the first and second pancake coils of a basic pair, with each pass being made through like interleaved sections of the basic pair,
    second means interconnecting the remaining like interleaved sections of each basic pair, to provide a single series shielding circuit in each pair,
    third means interconnecting the power circuits of the adjacent pancake coils of successively adjacent basic pairs of pancake coils, to provide a winding having a single series power circuit therethrough;
    and the fourth means connecting a single point of the shielding circuit of each of the basic pairs of pancake coils to the series power circuit.

2. The winding of claim 1 wherein the power circuit traverses the same interleaved section in each of the basic pairs of pancake coils.

3. The winding of claim 1 wherein the power circuit traverses the same interleaved sections in certain of the basic pairs of pancake coils, and the other interleaved sections in the remaining basic pairs of pancake coils.

4. The winding of claim 1 wherein the first means in a basic pair connects the inner ends of the first coil sections, and the second means connects the inner ends of the second coil sections.

5. The winding of claim 4 wherein the fourth means connects the outer end of the shielding circuit in the second pancake coil of a basic pair, to the outer end of the power circuit in the first pancake coil of the basic pair.

6. The winding of claim 4 wherein the fourth means connects the outer end of the shielding circuit in the first pancake coil of a basic pair to the outer end of the power circuit in the second pancake coil of the basic pair.

7. The winding of claim 1 wherein the first means in a basic pair connects the inner ends of the second coil sections, and the second means connects the inner ends of the first coil sections.

8. The winding of claim 7 wherein the fourth means connects the outer end of the shielding circuit in the second pancake coil of a basic pair, to the outer end of the power circuit in the first pancake coil of the pair.

9. The winding of claim 7 wherein the fourth means connects the outer end of the shielding circuit on a first pancake coil of a basic pair, to the outer end of the power circuit in the second pancake coil of the pair.

10. A winding for electrical inductive apparatus, comprising:
a plurality of pancake coils arranged in a stack,
each of said pancake coils having a plurality of turns of first and second conductors wound together to provide first and second radially interleaved sections, respectively, each having inner and outer ends,
first means interconnecting said pancake coils in basic pairs of first and second adjacent pancake coils to provide a single series power circuit in each pair which includes a single pass through the first and second pancake coils of a basic pair, with the passes being made through unlike interleaved sections of the pair, and with the remaining interleave sections of each coil being a shielding circuit,
second means interconnecting the power circuits of the adjacent pancake coils of successively adjacent basic pairs of pancake coils, to provide a winding having a single series power circuit therethrough,
and third means connecting a single point of the shielding circuit of each pancake coil to the power circuit.

11. The winding of claim 10 wherein the power circuit traverses the unlike interleaved sections of the first and second pancake coils in the same sequence in each of the basic pairs of pancake coils.

12. The winding of claim 10 wherein the power circuit traverses the unlike interleaved sections of the first and second pancake coils in the same sequence in certain of the basic pairs of pancake coils, and in the opposite sequence in the remaining basic pairs of pancake coils.

13. The winding of claim 10 wherein the first means interconnects the inner ends of the first and second interleaved sections in the first and second pancake coils, respectively, of at least certain of the basic pairs of pancake coils.

14. The winding of claim 13 wherein the third means interconnects the outer end of the shielding circuit of the first pancake coil of a basic pair of the inner end of the power circuit of the first pancake coil, and the inner end of the shielding circuit of the second pancake coil to the outer end of the power circuit of the second pancake coil.

15. The winding of claim 13 wherein the third means interconnects the inner end of the shielding circuit of the first pancake coil of a basic pair to the outer end of the power circuit of the first pancake coil, and the outer end of the shielding circuit of the second pancake coil of the basic pair to the inner end of the power circuit of the second pancake coil of the pair.

16. The winding of claim 13 wherein the third means interconnects the outer ends of the shielding circuits of the first and second pancake coils of a basic pair to the outer ends of the power circuits of the second and first pancake coils, respectively, of the pair.

17. The winding of claim 16 wherein the first means interconnects the inner ends of the second and first interleaved sections in the first and second pancake coils, respectively, in at least certain of the basic pairs of pancake coils.

18. The winding of claim 17 wherein the third means interconnects the outer end of the shielding circuit of the first pancake coil of a basic pair to the inner end of the power circuit of the first pancake coil, and the inner end of the shielding circuit of the second pancake coil to the outer end of the power circuit of the second pancake coil.

19. The winding of claim 17 wherein the third means interconnects the inner end of the shielding circuit of the first pancake coil of a basic pair to the outer end of the power circuit of the first pancake coil, and the outer end of the shielding circuit of the second pancake coil of the pair to the inner end of the power circuit of the second pancake coil of the pair.

20. The winding of claim 17 wherein the third means interconnects the outer ends of the shielding circuits of the first and second pancake coils of a basic pair to the outer ends of the power circuits of the second and first pancake coils, respectively, of the pair.

References Cited

UNITED STATES PATENTS

| | | | |
|---|---|---|---|
| 2,905,911 | 9/1959 | Kurita | 336—70 |
| 3,160,838 | 12/1964 | Bedil | 336—69 |
| 3,380,007 | 4/1968 | Alverson et al. | 336—70 |
| 3,391,365 | 7/1968 | Tipton | 336—70 |

THOMAS J. KOZMA, Primary Examiner

U.S. Cl. X.R.

336—84